(12) United States Patent
Bai et al.

(10) Patent No.: US 11,275,380 B2
(45) Date of Patent: Mar. 15, 2022

(54) VIRTUAL WALL SYSTEM FOR MOBILE DEVICES AND IMPLEMENTATION METHOD THEREOF

(71) Applicant: SHANGHAI SLAMTEC CO., LTD., Shanghai (CN)

(72) Inventors: Jing Bai, Shanghai (CN); Wenhao He, Shanghai (CN); Benniu Ji, Shanghai (CN); Junchao Lv, Shanghai (CN); Di Zhang, Shanghai (CN); Yuxiang Li, Shanghai (CN); Jueshen Huang, Shanghai (CN); Shikai Chen, Shanghai (CN)

(73) Assignee: SHANGHAI SLAMTEC CO., LTD., Shanghai (CN)

( * ) Notice: Subject to any disclaimer, the term of this patent is extended or adjusted under 35 U.S.C. 154(b) by 0 days.

(21) Appl. No.: 16/496,453

(22) PCT Filed: Mar. 23, 2018

(86) PCT No.: PCT/CN2018/080271
§ 371 (c)(1),
(2) Date: Sep. 23, 2019

(87) PCT Pub. No.: WO2018/171735
PCT Pub. Date: Sep. 27, 2018

(65) Prior Publication Data
US 2021/0109532 A1  Apr. 15, 2021

(30) Foreign Application Priority Data
Mar. 24, 2017  (CN) .......................... 201710181097.4

(51) Int. Cl.
*G05D 1/02*    (2020.01)
*G06F 16/901*    (2019.01)
(Continued)

(52) U.S. Cl.
CPC ....... *G05D 1/0214* (2013.01); *G01C 21/3848* (2020.08); *G05D 1/0088* (2013.01); *G06F 16/9024* (2019.01)

(58) Field of Classification Search
CPC .. G05D 1/0214; G05D 1/0088; G05D 1/0274; G05D 2201/0203; G01C 21/3848; G06F 16/9024
See application file for complete search history.

(56) References Cited

U.S. PATENT DOCUMENTS 7,579,803 B2    8/2009  Jones et al.
9,534,899 B2*   1/2017  Gutmann ................ G01S 17/06
(Continued)

FOREIGN PATENT DOCUMENTS

CN    102890507 A    1/2013
CN    103324192 A    9/2013
(Continued)

*Primary Examiner* — Michael J Zanelli
(74) *Attorney, Agent, or Firm* — Bayramoglu Law Offices LLC

(57) ABSTRACT

The invention discloses a virtual wall system for mobile devices and implementation method thereof. The virtual wall system for mobile devices includes: communication module: which is mainly used for the transmissions of relevant map information, virtual wall information, positioning information, and task information, and act as a bridge; interaction module: by which users set, add or delete the virtual wall information of any shape through the graphical editing environment, and sends this information to the processing part of the intelligent mobile algorithm; acquisition module: which obtains the virtual wall information provided by the interaction module, stores relevant data. The present needs no additional cost to produce additional auxiliary hardware devices, and is more convenient, flexible and fast for use.

5 Claims, 1 Drawing Sheet

(51) Int. Cl.
*G01C 21/00* (2006.01)
*G05D 1/00* (2006.01)

(56) References Cited

U.S. PATENT DOCUMENTS

| | | | |
|---|---|---|---|
| 9,592,609 B2 * | 3/2017 | LaFary | B25J 9/1676 |
| 10,496,262 B1 * | 12/2019 | Ebrahimi Afrouzi | B25J 11/0085 |
| 10,946,520 B2 * | 3/2021 | Kim | A47L 11/24 |
| 2019/0094869 A1 * | 3/2019 | Artes | G05D 1/0274 |
| 2019/0133402 A1 * | 5/2019 | Xie | A47L 11/40 |

FOREIGN PATENT DOCUMENTS

| | | | |
|---|---|---|---|
| CN | 106843230 A | | 6/2017 |
| CN | 107063242 | * | 8/2017 |
| JP | 0610774 B2 | | 2/1994 |
| KR | 101427186 B1 | | 8/2014 |

* cited by examiner

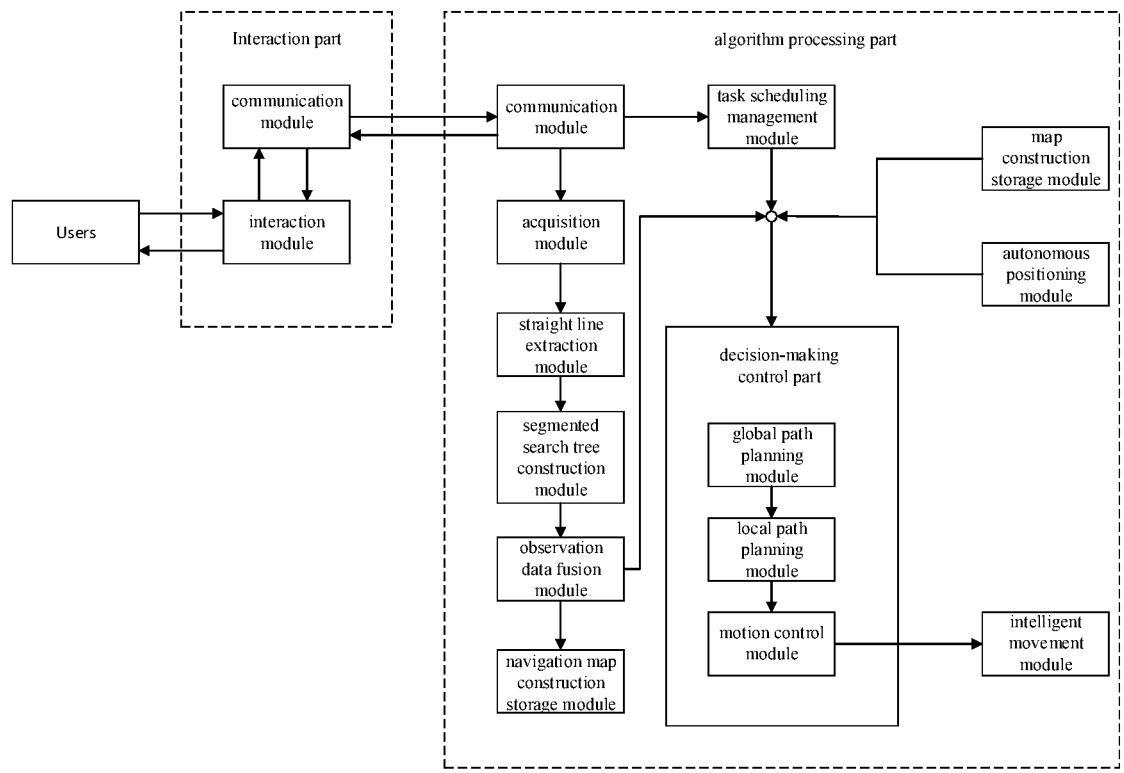

VIRTUAL WALL SYSTEM FOR MOBILE DEVICES AND IMPLEMENTATION METHOD THEREOF

CROSS REFERENCE TO RELATED APPLICATIONS

This application is the national phase entry of International Application No. PCT/CN2018/080271, filed on Mar. 23, 2018, which is based upon and claims priority to Chinese Patent Application No. 201710181097.4, filed on Mar. 24, 2017, the entire contents of which are incorporated herein by reference.

TECHNICAL FIELD

The present invention relates to a virtual wall system and implementation method thereof, particularly to a virtual wall system for mobile devices and implementation method thereof.

BACKGROUND

At present, virtual wall implementation technology mainly includes the following two types:

First, active virtual wall. This method uses active emitter, such as an emitter to emit infrared signal or ultrasonic signal (such as the United States patent with patent number "U.S. Pat. No. 7,579,803B2"), through infrared or ultrasonic receiver configured on the robot to receive the signal, to keep away from the region with the signal. The solution has some deficiencies: 1. It needs additional configuration of active emitters. When the emitter is in use, it requires an external power source or installing battery to provide the power supply. This would increase the cost, and would be very inconvenient to use (external power source needs extra sockets, and may cause abnormal behavior problems because of wires dragging on the floor; and using the battery needs the regular replacement of the battery, which would consume human and material cost); 2. Infrared light will have diffusion problems. The farther the distance is, the greater the angle error will be, and it is easy to reflect, which would mistakenly trigger avoidance behavior, and affect the normal movement of mobile devices.

Second, the magnetic boundary virtual wall. This method uses magnetic boundary, that is, the magnetic strip is attached to the boundary of the restricted region, and the mobile device moves to the region, through relevant sensors the device carrying, the magnetic strip is detected and the mobile device can realize the effect of avoiding the region. The solution also has some deficiencies: 3. Operation is cumbersome. Although the magnetic strip can be cut, it needs to be manually pasted and needs extra purchase of magnetic strips, and both ends of the magnetic strip would arch easily, which would increase the cost; 4. The indoor environment will be changed and the indoor appearance will be affected, and there will be a problem of blocking the walking of people and other problems. The invention provides a new virtual wall system based on the deficiencies of the existing virtual wall implementation method.

SUMMARY

The technical problems to be solved by the present invention is to provide a virtual wall system for mobile devices and implementation method thereof, which needs no extra cost to produce extra auxiliary hardware devices, and is more convenient, flexible and fast for use. In addition, it does not need to change the environment, and is more convenient to add and remove virtual wall and more intelligentized. Meanwhile, it also overcomes abnormal motor behavior caused by interference and is more accurate and reliable.

The invention solves the above technical problems through the following technical solutions: a virtual wall system for mobile devices, wherein, it includes:

communication module: the communication module is mainly configured for the transmissions of relevant map information, virtual wall information, positioning information, and task information, and acts as a bridge;

interaction module: users set, add or delete the virtual wall information with any shape through the graphical editing environment, and sends the information to the processing part of the intelligent movement algorithm;

acquisition module: the acquisition module gets the virtual wall information provided by the interaction module, and stores relevant data;

straight line extraction module: the straight line extraction module uses Hough transformation or other straight line extraction methods to extract the straight line information in the virtual wall; extra noise points are filtered and more accurate data is provided; and the more accurate data of the straight line information in the virtual wall is the prerequisite of segmented search tree construction and fast search;

segmented search tree construction module: the segmented search tree construction module uses the straight line information of virtual wall extracted by the straight line extraction module, and the segmented search tree is constructed by dichotomy to accelerate the efficiency of multi-sensor data fusion;

observation data fusion module: the observation data fusion module combines with segmented search tree and multi-sensor data connected by the system, combines with angle information, sensor data fusion is carried out to obtain multi-sensor fusion information for decision-making control part, and to provide data support for navigation obstacle avoidance function;

navigation map construction storage module: the navigation map construction storage module uses the virtual wall information extracted by the straight line extraction module to update the navigation map data in real time; this module mainly provides data support for the global path planning module, so as to plan the path bypasses the virtual wall during the path planning;

task scheduling management module: the task scheduling management module is mainly configured to manage navigation tasks issued by users, including setting task sequence, task distribution, task execution logic, invoking path planning service and other parts; it is the control center of the whole system;

map construction storage module: the map construction storage module is a virtual map construction storage module, and the map construction storage module mainly uses SLAM (Simultaneous Localization And Mapping) related algorithm to build an environment map; the environment map can be used for global path planning and autonomous positioning module, the map construction storage module is the core module of intelligent mobile algorithm;

autonomous positioning module: based on the current sensor information, the autonomous positioning module constructs the storage module by combining the map, and the relevant matching algorithm is used to obtain the current position and orientation information, so that the intelligent device can know its position and in the environment in real time;

global path planning module: the global path planning module uses map construction storage module, and autonomous positioning module to obtain the autonomous positioning information, combines with heuristic search algorithm, searches the global optimal path without collision from the starting point to the end point to guide the intelligent device to complete the navigation tasks being set;

local path planning module: the local path planning module uses multi-sensor fusion data, current global path and autonomous positioning information, and combines with the current speed information to generate a smooth collision-free control decision by dynamic window algorithm; so that the intelligent device can complete the specified cruise task without collision;

motion control module: the motion control module uses collision free control decisions generated by the local path planning module, combines with the intelligent devices motion model, generates motion control decisions, to control the smooth and collision-free movement of intelligent devices at a certain speed;

intelligent movement module: the intelligent movement module receives the instruction of motion control module to control the collision-free movement of the device.

Preferably, the communication module includes a client communication module and a communication module of a system algorithm processing layer.

Preferably, the communication module and the interaction module constitute the interaction part.

Preferably, the acquisition module, the straight line extraction module, the segmented search tree construction module, the observation data fusion module, the navigation map construction storage module, the task scheduling management module, the map construction storage module, the autonomous positioning module, the global path planning module, the local path planning module, the motion control module, and the intelligent movement module constitute the algorithm processing part.

The invention also provides an implementation method of a virtual wall system for mobile devices, wherein, includes the following steps:

step 1: setting, adding, deleting and editing the virtual wall information through the interaction module by users, the virtual wall information is sent to the algorithm processing part by the communication module;

step 2: receiving the corresponding virtual wall information sent by the interaction module, by the communication module of the algorithm processing part, and sending corresponding virtual wall information to the acquisition module;

step 3: after obtaining the relevant information of the virtual wall by the acquisition module, in the straight line extraction module, adopting Hough transformation or other straight line extraction algorithm to process the virtual wall information accordingly, and marking the life cycle, starting point, ending point of the virtual wall information and extracting the straight-line characteristics of the virtual wall information;

step 4: using the virtual wall information of the straight line extraction module, according to the angle information of the starting point and the ending point of the straight line, constructing and updating the segment search tree by dichotomy to add or remove relevant virtual wall information;

step 5: according to the data information of other sensors in the system, combining with the segmented search tree, searching the observation data at all angles to generate the fused observation data at all angles;

step 6: using multi-sensor data and combining raytrace algorithm to build a global navigation map for navigation obstacle avoidance module;

step 7: after receiving the navigation task by the communication module, using the current global navigation map and real-time autonomous positioning information, using heuristic search algorithm and combining starting point and ending point of the intelligent device to search a smooth collision-free path by the decision part; determining whether the destination is reachable, if not, ending the current task; If yes, going to step 8;

step 8: according to the path generated in step 7, combining with the—current fusion observation information and autonomous positioning information of the mobile device, and according to the 's motion speed and model of the mobile device, using dynamic window algorithm to search feasible windows and control decision; determining whether the feasible windows are found; if yes, going to step 9; otherwise, going to step 7 and trying to search for other accessible paths;

step 9: smoothing the speed according to the control decision of step 8, issuing control instructions to the mobile device, and controlling the movement of the mobile device.

The technical effects of the present invention are as follows: by the invention, users can set, add and delete virtual wall with any shape in interactive interface by interaction way, and this information is sent to the algorithm processing module. The present invention uses the straight line extraction algorithm and other related algorithms to extract the virtual wall data, and stores the data in the segmented search tree according to angle information as to be convenient for post fusion of multi-sensor data to carry out navigation obstacles avoidance behavior, and provides a powerful data support for intelligent movement of mobile devices. Compared to the existing virtual wall technology, the present invention does not need additional cost to produce additional auxiliary hardware devices, and is more convenient, flexible and fast for use. In addition, it does not need to change the environment, and it is more convenient to add and remove the virtual wall and more intelligentized. Meanwhile, the present invention also overcomes abnormal motor behavior caused by interference, and is more accurate and reliable.

BRIEF DESCRIPTION OF THE DRAWINGS

FIG. 1 is a schematic diagram of the present invention.

DETAILED DESCRIPTION OF THE EMBODIMENTS

In order to specifically explain the technical solution of the present invention, a preferred embodiment of the present invention is specified in combination of the drawing as follows.

As shown in FIG. 1, a virtual wall system for mobile devices of the present invention includes:

communication module: which is mainly used for the transmissions of relevant map information, virtual wall information, positioning information, and task information, and acts as a bridge;

interaction module: by which users set, add or delete the virtual wall information with any shape through the graphical editing environment, and sends the information to the processing part of the intelligent movement algorithm;

acquisition module: which obtains the virtual wall information provided by the interaction module, and stores relevant data;

straight line extraction module: which uses Hough transformation or other straight line extraction methods to extract the straight line information in the virtual wall. It filters extra noise points and provides more accurate data. It is the prerequisite of segmented search tree construction and fast search;

segmented search tree construction module: which uses the straight line extraction module to extract the straight line information of virtual wall, and the segmented search tree is constructed by dichotomy to accelerate the efficiency of multi-sensor data fusion;

observation data fusion module: which combines with segmented search tree and multi-sensor data connected by the system, combines with angle information, sensor data fusion is carried out to obtain multi-sensor fusion information for decision-making control part, and to provide data support for navigation obstacle avoidance function;

navigation map construction storage module: which uses the virtual wall information extracted by the straight line extraction module to update the navigation map data in real time. This module mainly provides data support for the global path planning module, so as to plan the path which bypasses the virtual wall during the path planning;

task scheduling management module: this module is mainly used to manage navigation tasks issued by users, including setting task sequence, task distribution, task execution logic, invoking path planning service and other parts. It is the control center of the whole system;

map construction storage module: which mainly uses SLAM related algorithm to build environment map. The environment map can be used for global path planning and autonomous positioning module, which is the core module of intelligent mobile algorithm;

autonomous positioning module: which is based on the current sensor information, the storage module is constructed by combining the map, and the relevant matching algorithm is used to obtain the current position and orientation information, so that the intelligent device can know its position in the environment in real time to solve the problem of "Where am I";

global path planning module: which uses the map construction storage module and autonomous positioning module to obtain the autonomous positioning information, combines with heuristic search algorithm, then searches the global optimal path without collision from the starting point to the end point to guide the intelligent device to complete the navigation tasks being set to solve the problem of "How To Go";

local path planning module: which uses multi-sensor fusion data, current global path and autonomous positioning information, and combines with the current speed information to generate a smooth collision-free control decision by dynamic window algorithm. So that the intelligent device can complete the specified cruise task without collision;

motion control module: which uses collision free control decisions generated by the local path planning module, combines with the intelligent devices motion model, generates motion control decisions, to control the smooth collision-free movement of intelligent devices at a certain speed;

intelligent movement module: which receives the instruction of motion control module to control the collision-free movement of the device.

The communication module and the interaction module constitute the interaction part.

The acquisition module, the straight line extraction module, the segmented search tree construction module, the observation data fusion module, the navigation map construction storage module, the task scheduling management module, the map construction storage module, the autonomous positioning module, the global path planning module, the local path planning module, the motion control module, the intelligent movement module constitute the algorithm processing part.

An implementation method of a virtual wall system for mobile devices provided by the invention includes the following steps:

step 1: the user sets, adds, deletes and edits the virtual wall information through the interaction module, the virtual wall information is sent to the algorithm processing part by the communication module;

step 2: the communication module of the algorithm processing part, receives the corresponding virtual wall information sent by the interaction module, and sends the information to the acquisition module;

step 3: after the acquisition module obtaining the relevant virtual wall information, in the straight line extraction module, Hough transformation or other straight line extraction algorithm is adopted to process the virtual wall information accordingly, and the life cycle, starting point and ending point are marked and the straight line characteristics of the virtual wall information are extracted;

step 4: using the virtual wall information of the straight line extraction module, according to the angle information of the starting point and the ending point of the straight line, segment search tree is constructed and updated by dichotomy to add or remove relevant virtual wall information;

step 5: according to the data information of other sensors in the system, combines with the segmented search tree, the observation data at all angles are searched to generate the fused observation data at all angles after step 6: using multi-sensor data and combine raytrace algorithm to build a global navigation map for navigation obstacle avoidance module;

step 7: after the communication module receives the navigation task, the decision part uses the current global navigation map and real-time autonomous positioning information, uses heuristic search algorithm and combines starting point and ending point of the intelligent device to search a smooth collision-free path. If the destination is not reachable, end the current task; If the destination is reachable, go to step 8;

step 8: according to the path generated in step 7, combining with the current fusion observation information and autonomous positioning information of the mobile device, and according to the motion speed and model of the mobile device, using dynamic window algorithm to search windows and control decision. If the feasible window is found, go to step 9; otherwise, go to step 7 and try to search for other accessible paths;

step 9: smoothening the speed according to the control decision of step 8, issuing control instructions to the mobile device, and controlling the movement of the mobile device.

The foregoing specific embodiment further explains specifically the technical problems, the technical solution and beneficial effects of the invention. What should be understood is that the above is only a specific embodiment of the present invention, which is not used to limit the invention. Any modifications, equivalent replacement, improvement, etc. within the spirits and principles of the present invention, shall be included in the protection scope of the present invention.

What is claimed is:

1. A virtual wall system for confining a robot, comprising:
   a communication module: wherein the communication module is configured for a communication of relevant map information, virtual wall information, positioning information and task information, and acts as a bridge between a user and an algorithm processing part;
   an interaction module: wherein the user sets, adds or deletes the virtual wall information through graphical editing environment, and the interaction module sends the virtual wall information to the algorithm processing part;
   an acquisition module: wherein the acquisition module obtains the virtual wall information provided by the interaction module, and stores relevant data of the virtual wall information;
   a straight line extraction module: wherein the straight line extraction module uses Hough transformation or other straight line extraction methods to extract straight line information in a virtual wall; the straight line extraction module filters extra noise points and provides accurate data; the accurate data is a prerequisite of segmented search tree construction and fast search;
   a segmented search tree construction module: wherein the segmented search tree construction module uses the straight line extraction module to extract the straight line information of the virtual wall, and a segmented search tree is constructed by dichotomy to accelerate an efficiency of multi-sensor data fusion;
   an observation data fusion module: wherein the observation data fusion module combines with the segmented search tree and multi-sensor data of the robot connected by the virtual wall system, combines with angle information, fuses the multi-sensor data to obtain multi-sensor fusion information, and to provide data support for a navigation obstacle avoidance function;
   a navigation map construction storage module: wherein the navigation map construction storage module uses the virtual wall information extracted by the straight line extraction module to update navigation map data in real time; the navigation map construction storage module provides data support for a global path planning module, so as to plan a path to avoid the virtual wall during a path planning;
   a task scheduling management module: wherein the task scheduling management module is configured to manage navigation tasks issued by the user, including setting task sequence, task distribution, task execution logic, and invoking path planning service, and is a control center of the virtual wall system;
   a map construction storage module: wherein the map construction storage module is configured to build an environment map; the environment map is configured for the global path planning module and an autonomous positioning module;
   the autonomous positioning module: wherein the autonomous positioning module is based on current sensor information, combines with the map construction storage module and uses a matching algorithm to obtain current position information and orientation information, so that the robot knows its position in an environment in real time;
   the global path planning module: wherein the global path planning module uses the map construction storage module and the autonomous positioning module to obtain autonomous positioning information, combines with heuristic search algorithm, searches a global optimal path without collision from a starting point to an end point to guide the robot to complete the navigation tasks being set;
   a local path planning module: wherein the local path planning module uses the multi-sensor fusion information, current global path and the autonomous positioning information, and combines with current speed information to generate a smooth collision-free control decision by dynamic window algorithm; so that the robot completes the navigation tasks without collision;
   a motion control module: wherein the motion control module uses the collision free control decision generated by the local path planning module, combines with a motion model of the robot, generates motion control decisions to control a smooth collision-free movement of the robot at a certain speed;
   an intelligent movement module: wherein the intelligent movement module receives instruction of the motion control module to control the smooth collision-free movement of the robot;
   wherein each module of the virtual wall system is implemented on the robot.

2. The virtual wall system of claim 1, wherein, the communication module comprises a client communication module and a communication module of the algorithm processing part.

3. The virtual wall system of claim 1, wherein, the communication module and the interaction module constitute an interaction part.

4. The virtual wall system of claim 1, wherein, the acquisition module, the straight line extraction module, the segmented search tree construction module, the observation data fusion module, the navigation map construction storage module, the task scheduling management module, the map construction storage module, the autonomous positioning module, the global path planning module, the local path planning module, the motion control module, and the intelligent movement module constitute the algorithm processing part.

5. An implementation method of a virtual wall system for confining a robot, comprising the following steps:
   step 1: setting, adding, deleting and editing virtual wall information through an interaction module by a user, the virtual wall information is sent to an algorithm processing part by a communication module;
   step 2: receiving, by the communication module of the algorithm processing part, the virtual wall information sent by the interaction module, and sending the virtual wall information to an acquisition module;
   step 3: after obtaining the virtual wall information by the acquisition module, in a straight line extraction module, adopting Hough transformation or other straight line extraction algorithm to process the virtual wall information, and marking a life cycle, a starting point, an ending point and extracting straight-line characteristics of the virtual wall information;
   step 4: using the virtual wall information of the straight line extraction module, according to angle information of the starting point and the ending point of the straight line, constructing and updating segment search tree by dichotomy to add or remove the virtual wall information;
   step 5: according to data information of sensors in the virtual wall system, combining with the segmented search tree, searching observation data at all angles to generate fused observation data at all angles;

step 6: using multi-sensor data and combining raytrace algorithm to build a global navigation map for a navigation obstacle avoidance module;

step 7: after the communication module receiving a navigation task, using a current global navigation map and real-time autonomous positioning information, using heuristic search algorithm and combining the starting point and the ending point of the robot to search a smooth collision-free path by a decision part, determining whether a destination is reachable, if not, ending the navigation task; if yes, going to step 8;

step 8: according to the smooth collision-free path generated in step 7, combining with current fusion observation information of the robot and autonomous positioning information, and according to a motion speed and a model of the robot, using dynamic window algorithm to search feasible windows and a control decision;

determining whether the feasible windows are found, if yes, going to step 9; otherwise, going to step 7 and trying to search for other accessible paths;

step 9: smoothening the speed according to the control decision of step 8, issuing control instructions to the robot, and controlling movement of the robot.

* * * * *